(12) United States Patent
Chaudhary

(10) Patent No.: US 9,639,471 B2
(45) Date of Patent: May 2, 2017

(54) PREFETCHING ACCORDING TO ATTRIBUTES OF ACCESS REQUESTS

(71) Applicant: NVIDIA Corporation, Santa Clara, CA (US)

(72) Inventor: Anurag Chaudhary, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 11 days.

(21) Appl. No.: 13/686,798

(22) Filed: Nov. 27, 2012

(65) Prior Publication Data

US 2014/0149668 A1 May 29, 2014

(51) Int. Cl.
*G06F 12/00* (2006.01)
*G06F 12/0862* (2016.01)
*G06F 12/0897* (2016.01)

(52) U.S. Cl.
CPC ...... *G06F 12/0862* (2013.01); *G06F 12/0897* (2013.01); *G06F 2212/6026* (2013.01)

(58) Field of Classification Search
None
See application file for complete search history.

(56) References Cited

U.S. PATENT DOCUMENTS

| | | | |
|---|---|---|---|
| 6,345,339 B1 | 2/2002 | Arimilli et al. | |
| 6,507,895 B1 * | 1/2003 | Wang et al. | 711/137 |
| 7,975,108 B1 * | 7/2011 | Holscher | G06F 12/0862 |
| | | | 711/118 |
| 8,356,142 B1 | 1/2013 | Danilak | |
| 8,356,143 B1 | 1/2013 | Bulusu et al. | |
| 8,683,132 B1 | 3/2014 | Danilak | |
| 2007/0067382 A1 | 3/2007 | Sun | |
| 2007/0266228 A1 | 11/2007 | Smith et al. | |
| 2007/0283134 A1 | 12/2007 | Smith et al. | |
| 2008/0034187 A1 | 2/2008 | Stempel et al. | |
| 2009/0198909 A1 | 8/2009 | Speight et al. | |
| 2009/0216956 A1 | 8/2009 | Ekanadham et al. | |
| 2009/0248983 A1 | 10/2009 | Offen et al. | |
| 2011/0113199 A1 | 5/2011 | Tang et al. | |
| 2011/0161589 A1 * | 6/2011 | Guthrie et al. | 711/122 |
| 2012/0144104 A1 * | 6/2012 | Gibney et al. | 711/105 |
| 2013/0103912 A1 | 4/2013 | Jones et al. | |
| 2013/0185515 A1 | 7/2013 | Sassone et al. | |

(Continued)

OTHER PUBLICATIONS

Gao; et al., "Two-level Data Prefetchin", 2007, IEEE, pp. 238-244.

(Continued)

*Primary Examiner* — Baboucarr Faal (57) ABSTRACT

Attributes of access requests can be used to distinguish one set of access requests from another set of access requests. The prefetcher can determine a pattern for each set of access requests and then prefetch cache lines accordingly. In an embodiment in which there are multiple caches, a prefetcher can determine a destination for prefetched cache lines associated with a respective set of access requests. For example, the prefetcher can prefetch one set of cache lines into one cache, and another set of cache lines into another cache. Also, the prefetcher can determine a prefetch distance for each set of access requests. For example, the prefetch distances for the sets of access requests can be different.

9 Claims, 6 Drawing Sheets

(56) References Cited

U.S. PATENT DOCUMENTS

2014/0149668 A1  5/2014  Chaudhary
2014/0149678 A1  5/2014  Chadhary

OTHER PUBLICATIONS

Irie, et al., CCCPO: Robust Prefetcher Optimization Technique Based on Cache Convection, 2011 Second International Conference on Networking and Computing, Nov. 30, 2011-Dec. 2, 2011. p. 127-133, IEEE, Tokyo, Japan.

* cited by examiner

PREFETCHING ACCORDING TO ATTRIBUTES OF ACCESS REQUESTS

BACKGROUND

A primary factor in the utility of a computer system is the speed at which the computer system can execute an application. It is important to have instructions and data available at least as fast as the rate at which they can be executed, to prevent the computer system from idling (stalling) while it waits for the instructions and/or data to be fetched from main memory.

A widely used solution to reduce or prevent stalling is to implement a hierarchy of caches in the computer system. In essence, one or more caches are situated between the main memory and the central processing unit (CPU). The caches store recently used instructions and data based on the assumption that information might be needed again. By storing information in a hierarchical manner, the caches can reduce latency by providing information more rapidly than if the information had to be retrieved from, for example, the main memory.

The closer a cache is to the CPU, the shorter the latency between the cache and the CPU. The cache closest to the CPU is usually referred to as the level one (L1) cache, the next cache is usually referred to as the level two (L2) cache, and so on. Information most likely to be needed by the CPU, or information more recently accessed by the CPU, is stored in the L1 cache, the next tier of information is stored in the L2 cache, and so on.

Latency can be further reduced by prefetching information into the caches. Prefetching involves, in essence, making a prediction of the information that may be needed by an application, and then prefetching that information from, for example, the main memory into a cache, or from one cache into a cache that is closer to the CPU (e.g., from the L2 cache to the L1 cache).

Hardware-initiated prefetching is typically based on a pattern-matching mechanism. The traffic stream (e.g., the stream of access requests for instructions or data) is monitored to try to find a pattern to the requests. If a pattern can be found, then that pattern can be used to anticipate subsequent requests for information, so that information can be prefetched. For example, if the prefetcher determines that data has been requested from addresses 2, 4, and 6 in the L2 cache because of cache misses in the L1 cache (e.g., a pattern of every other address, corresponding to every other cache line), then the prefetcher can anticipate that the cache line at address 8 might also be needed and can prefetch that cache line.

There is a basic tradeoff in prefetching. As noted above, prefetching can improve performance by reducing latency. On the other hand, if too much information (e.g., too many cache lines) is prefetched, then the efficiency of the prefetcher may be reduced. Furthermore, if too much information is prefetched, then the cache might become polluted with cache lines that might not actually be needed. If the cache is full, then prefetching new cache lines into the cache can cause useful lines to be prematurely evicted in order to make room for the new lines.

The benefits and risks of prefetching both can increase as the prefetch distance is increased. The prefetch distance is a measure of how far to prefetch based on an observed pattern. If, for instance, data is fetched from addresses 2, 4, and 6 (a pattern of every other address), then data can be prefetched from address 8 if the prefetch distance is one, from addresses 8 and 10 if the prefetch distance is two, and so on. In general, the prefetch distance specifies the number of accesses projected along a pattern starting from a starting point in the pattern (usually, from the last demand access that is a part of the pattern).

The prefetch distance can be managed using a confidence value associated with the pattern. The confidence value, in effect, is a measure of how often the pattern is observed or, equivalently, the number of elements that make up the pattern. The confidence value, and hence the prefetch distance, may initially be zero; that is, prefetching might not begin as soon as an apparent pattern is detected. Instead, prefetching might begin only if the pattern is observed repeatedly; each time the pattern is observed, the confidence value can be incremented, and the prefetch distance can be increased when the confidence value reaches a threshold. In the example above, if the pattern indeed continues as expected and ends up including addresses 8 and 10 in addition to addresses 2, 4, and 6, then the confidence value might be incremented and prefetching can begin. If the pattern continues beyond address 10, then the confidence value and consequently the prefetch distance can again be increased. In other words, if the actual pattern continues to match the predicted pattern, then the confidence value can be increased and, in turn, the prefetch distance can be increased.

SUMMARY

As used herein, an access request refers to a request for information (data and/or instructions) from a memory element. An access request may be a request for a cache line or a number of cache lines. An access request may be a demand request issued by a processing unit, or it may be a request issued by a computer system's operating system or memory management system. In response to an access request, information may be fetched from a memory element to a processing unit, or it may be fetched from one memory element to another memory element (e.g., from main memory to a cache, or from one cache to another).

A stream of access requests may contain multiple, unrelated access requests. In other words, the access requests associated with one application, for example, may be interleaved with access requests associated with one or more other applications. Embodiments according to the present invention provide the capability to filter the various access requests so that related requests can be identified and distinguished from the other (unrelated) accesses. The related requests can then be examined to find a pattern to the requests, if there is one.

In one embodiment, attributes of the access requests are used to distinguish each set of related access requests from the other access requests. In an embodiment in which there is a hierarchy of caches, a prefetcher can then direct prefetched cache lines associated with a respective set of access requests to a selected cache. More specifically, the prefetcher can observe a stream of access requests, use the attributes of the access requests to identify a first set of related access requests, identify a pattern for the first set, prefetch a first set of cache lines based on that pattern, and direct the prefetched first set of cache lines into, for example, the L1 cache. In a similar manner, the prefetcher can use attributes of the access requests to identify a second set of related access requests, identify a pattern for the second set, prefetch a second set of cache lines based on the second pattern, and direct the second set of prefetched cache lines into, for example, the L2 cache. Also, the prefetcher can determine a prefetch distance for each set of access requests.

Thus, for example, the prefetch distance for the first set of access requests can be different from the prefetch distance for the second set of access requests.

In one embodiment, a first value of an attribute associated with a first set of access requests is used to distinguish those access requests from a second set of access requests. A pattern of the first set of access requests is determined. A number of cache lines are prefetched according to a prediction determined from the pattern. The cache lines are prefetched into a cache that is selected according to the value of the attribute. Similarly, a second set of access requests can be identified based on a second value of the attribute, a pattern of the second set of access requests is determined, a number of cache lines are prefetched according to a prediction determined from the second pattern, and the cache lines are prefetched into a cache that is selected according to the value of the attribute. Alternatively, values of different attributes (instead of different values for the same attribute) can be used to distinguish between sets of access requests.

For example, an attribute that can be used to filter the access requests is based on the memory addresses included in the requests. Many patterns are local and, if there is a pattern, then it usually exists within a relatively small region of memory (e.g., within a memory page). Thus, in one embodiment, a set of requests that address the same physical memory page are identified, and the physical addresses associated with those requests are examined to see if there is a pattern to them. Other attributes can be used to filter the access requests. Those attributes include, but are not limited to: virtual page number; transaction type; memory type; and source.

To summarize the features just described, related access requests can be identified (e.g., distinguished from the unrelated access requests) and grouped into "buckets." There can be any number of such buckets. The destinations for prefetched cache lines can be specified on a per-bucket basis; thus, for example, cache lines prefetched for each of the buckets can be directed to different caches. The prefetch distances for the various buckets can also be specified on a per-bucket basis; thus, for example, the prefetch distances for each of the buckets can be different. Other settings associated with the various buckets can also be specified on a per-bucket basis.

For one type of access request, it may be beneficial to define a larger prefetch distance and prefetch the corresponding number of cache lines into the L2 cache, as this will reduce the latency from the main memory, resulting in a performance gain without polluting the L1 cache. On the other hand, for another type of access request, it may be beneficial to define a smaller prefetch distance and prefetch the corresponding number of cache lines into the L1 cache. Similarly, cache lines prefetched for two different sets of access requests can both be directed to the L1 cache, but the prefetch distance for one set of access requests can be different from the prefetch distance for the other set of access requests. Essentially, embodiments according to the present invention provide the capability to dynamically tune the prefetcher, allowing greater control over prefetcher settings such as prefetch destination and prefetch distance.

These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "fetching," "prefetching," "selecting," "establishing," "observing," "using," "accessing," "identifying," "determining," "detecting," "selecting," or the like, refer to actions and processes (e.g., flowcharts 500 and 600 of FIGS. 5 and 6, respectively) of a computer system or similar electronic computing device or processor (e.g., system 100 of FIG. 1). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Non-transitory computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

Figure 1:
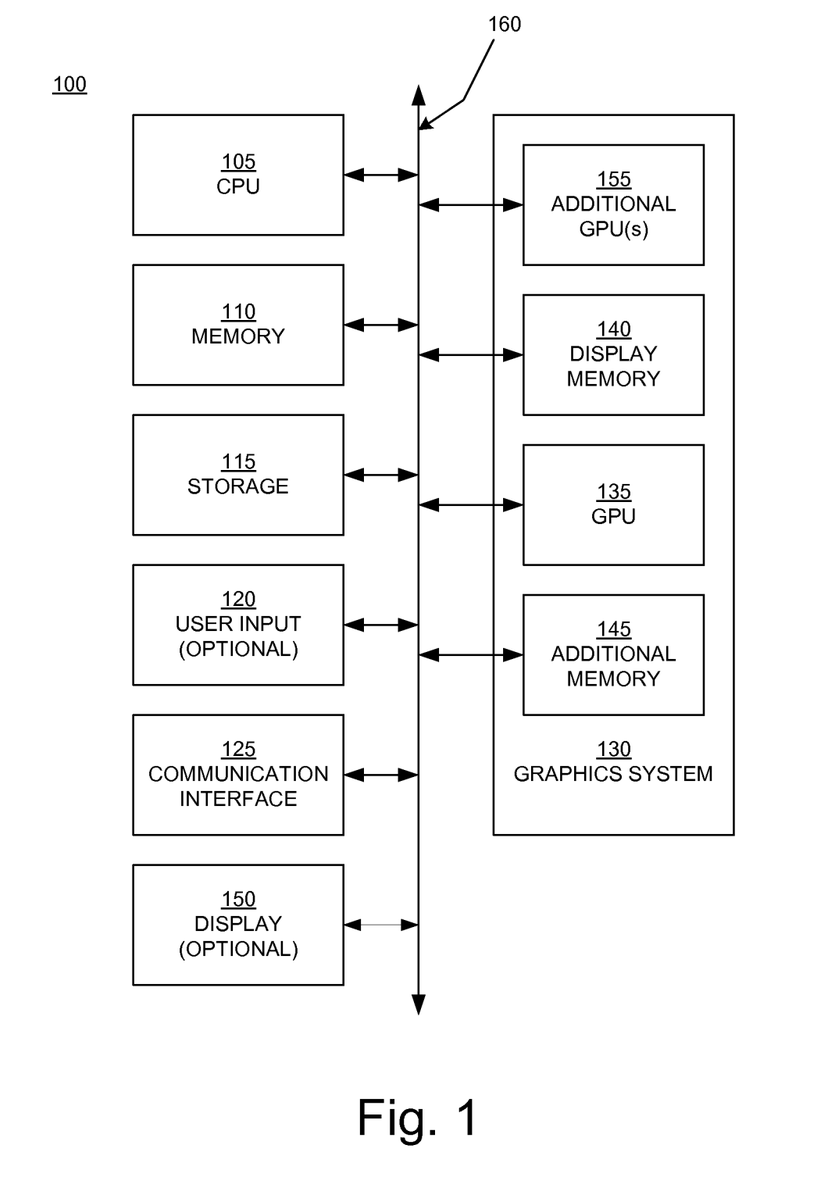
FIG. 1 is a block diagram of an example of a computer system capable of implementing embodiments according to the present invention.

FIG. 1 is a block diagram of an example of a computer system 100 capable of implementing embodiments according to the present invention. In the example of FIG. 1, the computer system 100 includes a central processing unit (CPU) 105 for running software applications and optionally an operating system. The memory 110 stores applications and data for use by the CPU 105. Storage 115 provides non-volatile storage for applications and data and may include fixed disk drives, removable disk drives, flash memory devices, and CD-ROM, DVD-ROM or other optical storage devices. The optional user input 120 includes devices that communicate user inputs from one or more users to the computer system 100 and may include keyboards, mice, joysticks, touch screens, and/or microphones. The communication or network interface 125 allows the computer system 100 to communicate with other computer systems via an electronic communications network, including wired and/or wireless communication and including the Internet. The optional display device 150 is any device capable of displaying visual information in response to a signal from the computer system 100. The components of the computer system 100, including the CPU 105, memory 110, data storage 115, user input devices 120, communication interface 125, and the display device 150, are connected via one or more data buses 160.

In the FIG. 1 embodiment, a graphics system 130 is connected with the data bus 160 and the components of the computer system 100. The graphics system 130 may include a physical graphics processing unit (GPU) 135 and graphics memory. The GPU 135 generates pixel data for output images from rendering commands.

Graphics memory may include a display memory 140 (e.g., a framebuffer) used for storing pixel data for each pixel of an output image. In another embodiment, the display memory 140 and/or additional memory 145 are part of the memory 110 and are shared with the CPU 105. Alternatively, the display memory 140 and/or additional memory 145 can be one or more separate memories provided for the exclusive use of the graphics system 130.

In another embodiment, graphics processing system 130 includes one or more additional physical GPUs 155, similar to the GPU 135. Each additional GPU 155 is adapted to operate in parallel with the GPU 135. Each additional GPU 155 generates pixel data for output images from rendering commands. Each additional physical GPU 155 can be configured as multiple virtual GPUs that are used in parallel (concurrently) by a number of applications executing in parallel. Each additional GPU 155 can operate in conjunction with the GPU 135 to simultaneously generate pixel data for different portions of an output image, or to simultaneously generate pixel data for different output images.

Each additional GPU 155 can be located on the same circuit board as the GPU 135, sharing a connection with the GPU 135 to the data bus 160, or each additional GPU 155 can be located on another circuit board separately connected with the data bus 160. Each additional GPU 155 can also be integrated into the same module or chip package as the GPU 135. Each additional GPU 155 can have additional memory, similar to the display memory 140 and additional memory 145, or can share the memories 140 and 145 with the GPU 135.

Figure 2A:
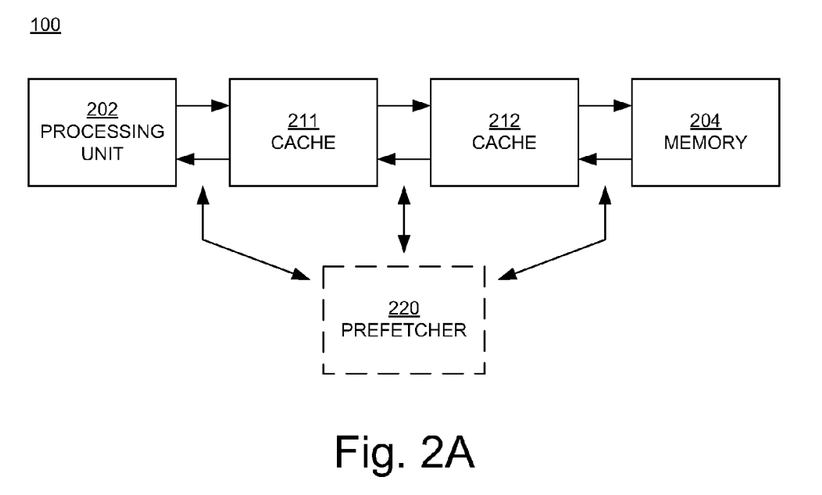
FIG. 2A is a block diagram of a computer system that includes a prefetcher in an embodiment according to the present invention.

FIG. 2A is a block diagram of a computer system 100 that includes a prefetcher 200 in an embodiment according to the present invention. In the example of FIG. 2A, a hierarchy of caches is located between the processing unit 202 and the memory 204. With reference to FIG. 1, the processing unit 202 may be, for example, the CPU 105 or the GPU 135, and the memory 204 may be, for example, the memory 110 or the storage 115, or the display memory 140 or the additional memory 145.

In the example of FIG. 2A, the caches include a first cache 211 and a second cache 212. Although only two caches are shown, embodiments according to the invention are not so limited. The first cache 211 is situated closer to the processing unit 202 than the second cache 212, and may be referred to as a level one (L1) cache. The second cache 212 is situated further away from the processing unit 202 relative to the first cache 211, and may be referred to as a level two (L2) cache. Generally speaking, the latency associated with the first cache 211 is less than the latency associated with the second cache 212.

The processing unit 202 can load or store information (data and/or instructions) into the first cache 211. The processing unit 202 can also request a line of information from the first cache 211; this type of request may be referred to as a demand request. If that information is in the first cache 211, it is referred to as a cache hit. If that line of information is not in the first cache 211 (referred to as a cache miss), then an attempt is made to access that line from the second cache 212. If that line is also not in the second cache 212, then an attempt is made to access that information from the memory 204 (or from another cache if the hierarchy of caches includes more than two caches). The operations just described can be performed under control of the computer system's operating system or memory management system, for example.

A prefetcher 220 is coupled to and can monitor the access requests between the various memory elements. Although the prefetcher 220 is illustrated as a separate element in FIG. 2A, it can be implemented in software as a component of the computer system's operating system or memory management system, for example.

Figure 2B:
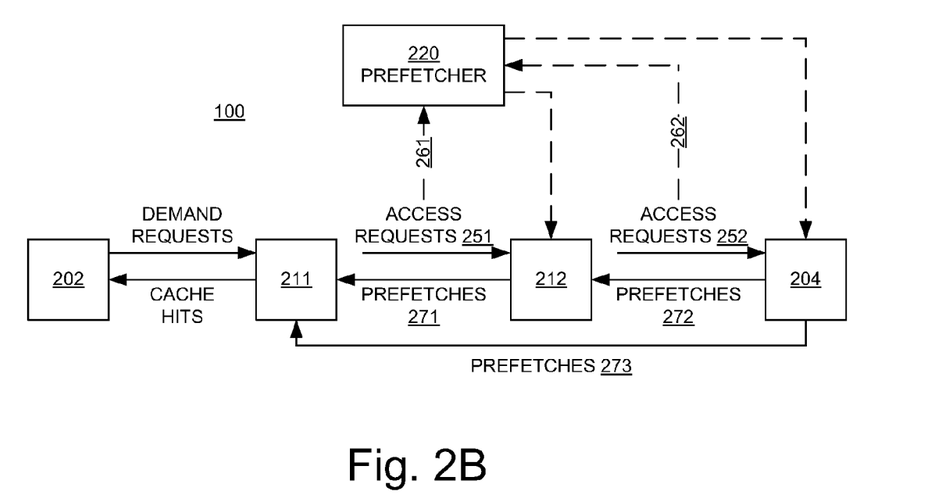
FIG. 2B is a block diagram illustrating the flow of information between elements including a prefetcher in an embodiment according to the present invention.

In particular, with reference to FIG. 2B, the prefetcher 220 can monitor and observe the stream 251 of access requests to the second cache 212, and can determine the pattern 261 of those requests. Also, the prefetcher 220 can monitor and observe the stream 252 of access requests to the memory 204, and can determine the pattern 262 of those requests.

The access requests issued to the second cache 212, for example, generally result from cache misses in the first cache 211. The prefetcher 220 can monitor cache misses in the first cache 211 and detect a pattern (the pattern 261) to the misses, if there is a pattern. That is, the prefetcher 220 can monitor the addresses included in demand requests to the first cache 211 and detect a pattern in the requests that result in cache misses in that cache. Alternatively, the prefetcher 220 can monitor the memory addresses included in the access requests to the second cache 212 (in order to fetch information from the second cache 212 to the first cache 211) and detect a pattern in those requests.

In general, a pattern can be detected based on the number of cache lines between two points in the pattern. The difference between two points in the pattern may be referred to as the delta or the stride. For example, if the pattern included access requests for every third cache line, then the delta or stride is three. The delta or stride between two access requests can be determined using the lower order bits of the address included in the access requests. If the delta or stride is constant over some number of access requests, then a pattern is present.

The prefetcher 220 can then make a prediction based on the pattern, and can prefetch lines from the second cache 212 to the first cache 211 based on the prediction. If, for example, the prefetcher 220 detects that the access requests to the second cache 212 are for every other cache line, then the prefetcher can prefetch every other cache line from the second cache 212 into the first cache 211. One or more lines can be prefetched at a time, depending on the prefetch distance and confidence level associated with the pattern, as described below. In the example of FIG. 2B, the prefetch stream 271 includes lines prefetched from the second cache 212 into the first cache 211 based on the pattern 261 that was determined by observing the stream 251 of access requests.

In a similar fashion, the prefetcher 220 can prefetch one or more lines (prefetch stream 272) from the memory 204 into the second cache 212, or one or more lines (prefetch stream 273) from the memory 204 directly into the first cache 211, or one or more lines from the memory 204 directly into both the first cache 211 and the second cache 212. Ideally, the cache lines in the prefetch streams 271, 272, and 273 precede a demand request for those lines.

Figure 3:
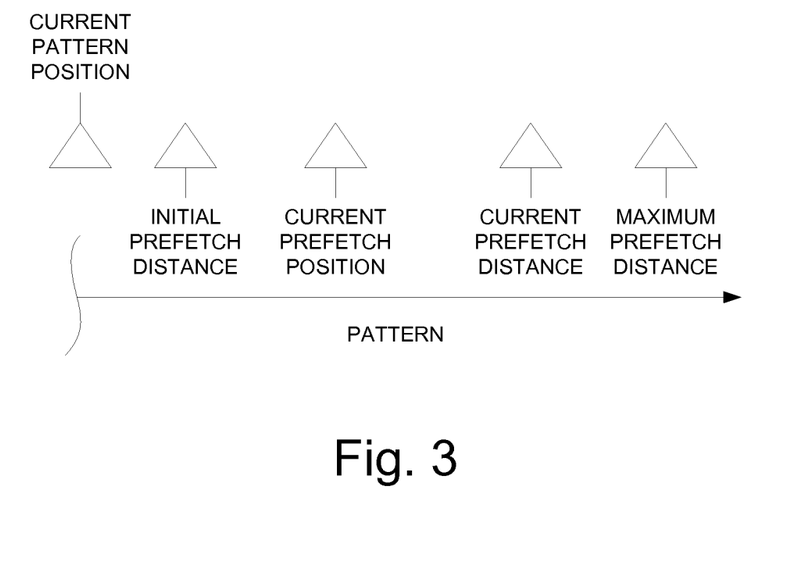
FIG. 3 illustrates prefetch distances in an embodiment according to the present invention.

In FIG. 3, the current pattern position indicates the last point in the pattern known to be correct. Prefetch distances are measured from the current pattern position. The current pattern position can move from left to right in FIG. 3 as points in the pattern are validated as correct. In other words, if a predicted access matches a later, actual access request (e.g., if a prefetched line results in a subsequent cache hit), then the current pattern position is moved accordingly.

The current prefetch position indicates how far prefetching has occurred within the pattern. The current prefetch position is between the current pattern position and the current prefetch distance. The prefetch distance is a measure of how far to prefetch in the pattern. The prefetch distance is determined by taking a starting point in the pattern (the current prefetch position) and projecting a number of accesses further along the pattern. The number of accesses is the prefetch distance. If the prefetch distance is one, then a single line (the next element in the pattern) is prefetched; if the prefetch distance is two, then the next two elements in the pattern are prefetched, and so on.

The initial prefetch distance can be established in advance. The prefetch distance may be initially set to one, for example, indicating that a single line will be prefetched at a time. The prefetch distance can change over time depending on, for example, the confidence level associated with the pattern. The confidence level can be incremented as the pattern increases in length and/or if the prefetched lines result in an increase in the frequency of cache hits.

In the example below (Table 1), the initial prefetch distance and initial confidence level are both zero (0). In the example, based on the addresses in the access requests issued in response to cache misses, a delta or stride of two (2) is observed by the prefetcher 220 (FIG. 2A). At some point, the confidence level is incremented as shown in the example. Once the confidence level reaches a threshold value (e.g., 2), then the prefetch distance can be increased. Generally speaking, the confidence level can be used as a factor in establishing the prefetch distance, but the prefetch distance is not necessarily directly correlated to the value of the confidence level.

TABLE 1

| Address | Delta | Confidence Level | Prefetch Distance |
|---------|-------|------------------|-------------------|
| 2       | —     | 0                | 0                 |
| 4       | 2     | 0                | 0                 |
| 6       | 2     | 1                | 0                 |
| 8       | 2     | 2                | 1                 |
| 10      | 2     | 3                | 2                 |
| etc.    | etc.  | etc.             | etc.              |

Continuing with reference to FIG. 3, the maximum prefetch distance is a defined (e.g., user-specified) limit on the prefetch distance. Thus, even if the confidence level continues to increase, the prefetch distance will not increase if the maximum prefetch distance has been reached.

Figure 4:
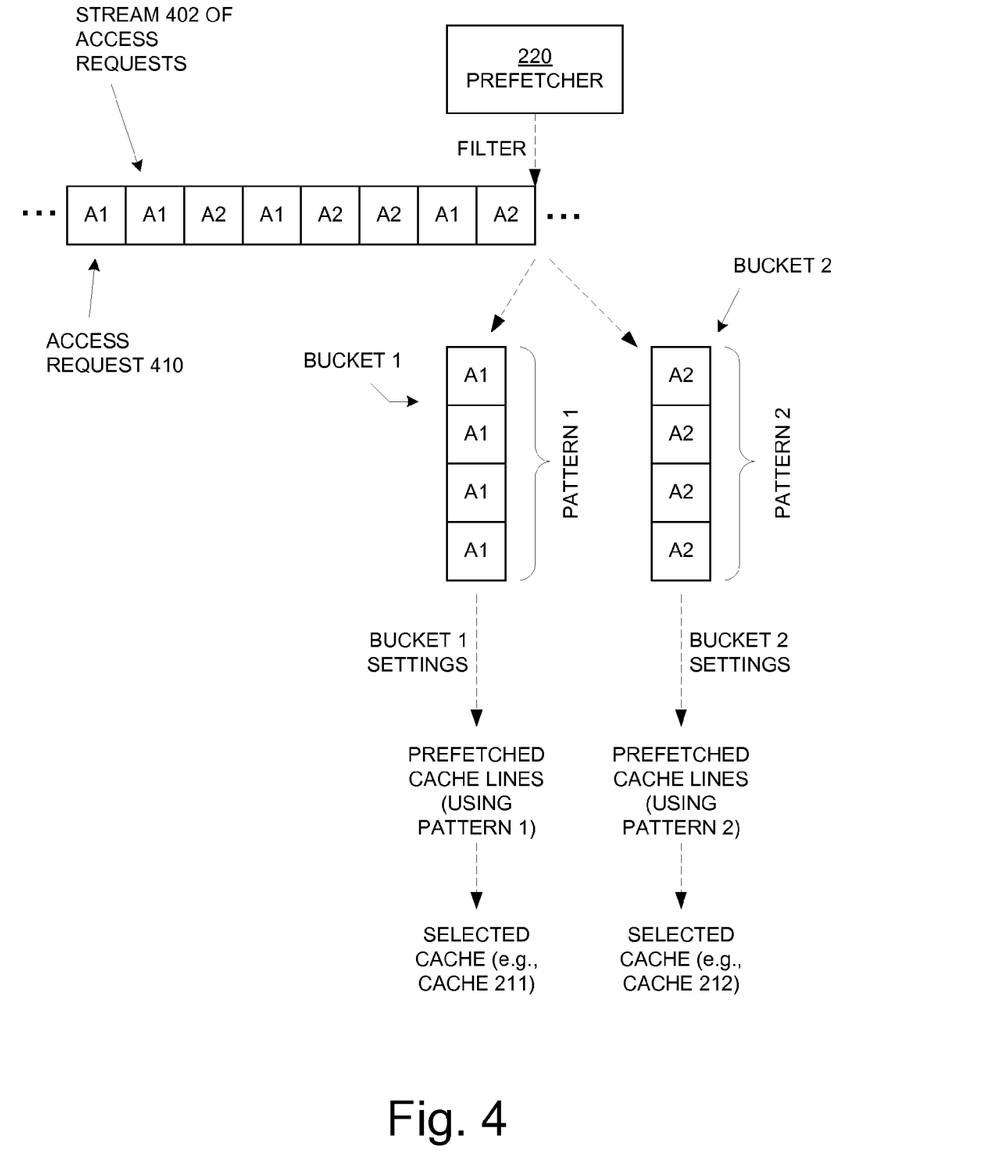
FIG. 4 is a data flow diagram illustrating prefetching according to attributes of access requests in an embodiment according to the present invention.

FIG. 4 illustrates prefetching according to attributes of access requests in an embodiment according to the present invention. A stream 402 of access requests (e.g., the access request 410) is observed by the prefetcher 220. The stream 402 may be one of the streams 251 or 252 of FIG. 2. Alternatively, the stream 402 may represent a combination of the streams 251 and 252. In general, the prefetcher 220 can observe a stream of access requests, which may be any of the single streams in the computer system 100 or a compilation of multiple such streams.

The stream 402 of access requests may include multiple, unrelated access requests. In the example of FIG. 4, the stream 402 includes two types of access requests. The first type of access request is identified as A1, and the second type of access request is identified as A2. There can be more than two types of access requests. The access requests A1 may be associated with a first application or a first thread, for example, while the access requests A2 may be associated with a second application or a second thread. In the example of FIG. 4, the access requests A1 are interleaved with the access requests A2 in the stream 402.

Embodiments according to the present invention provide the capability to filter the various access requests so that related requests can be identified and distinguished from the other (unrelated) accesses. For instance, considering the example of FIG. 4, the access requests A1 can be distinguished from the access requests A2, and vice versa.

With reference to FIG. 4, the prefetcher 220 can filter the stream 402 of access requests into different "buckets." The access requests are not necessarily physically isolated into such buckets. Instead, the prefetcher 220 logically groups the different sets of access requests into different buckets. In the example of FIG. 4, the first set of access requests A1 are filtered into bucket 1, and the second set of access requests are filtered into bucket 2. There can be any number of such buckets, depending on, for example, the number of types of access requests included in the stream 402.

In one embodiment, respective attributes of the access requests A1 and A2 are used to distinguish each set of related access requests from the other access requests.

One method of filtering the access requests is based on a comparison of the memory addresses included in the requests. Many patterns are local and, if there is a pattern, then it usually exists within a relatively small region of memory (e.g., within a four kilobyte [4 KB] memory page). Thus, in one embodiment, a set of requests that address the same physical memory page are identified, and the physical addresses associated with those requests are examined to see if there is a pattern to them.

Other attributes can be used to filter the access requests. Those attributes include, but are not limited to: virtual page number; transaction type; memory type; and source of the access request.

The virtual page number may correspond to different page sizes (e.g., 4 KB, 64 KB, etc.). The transaction type may include, for example, store permissions, load permissions, load misses, store misses, streaming accesses, etc. The memory type may include, for example, write back (WB), write combining (WC), write through (WT), non-mapped, etc. The source may include, for example, the CPU (CPU number), a subagent within the CPU (e.g., a memory management unit, instruction fetch unit, or load/store unit), etc.

The sets of related requests (that is, the buckets 1 and 2, for example) can then be examined to find respective patterns, if there is one. That is, the prefetcher 220 can examine the first set of access requests A1 to determine if there is a pattern to those requests, and can also examine the second set of access requests A2 to determine if there is a pattern to those requests.

The prefetcher 220 can examine the access requests included in each bucket independent of the access requests in any other bucket, to determine a pattern for the access requests in the bucket. Thus, the prefetcher 220 can determine a pattern (pattern 1) for the set of access requests A1 included in bucket 1, and can separately determine a pattern (pattern 2) for the set of access requests A2 included in bucket 2.

Also, different settings can be separately determined for each bucket. For example, the prefetcher 220 can determine a prefetch distance for each set of access requests (for each bucket). Thus, for example, the prefetch distance for the first set of access requests A1 (for bucket 1) can be different from the prefetch distance for the second set of access requests A2 (for bucket 2).

The prefetcher 220 can also dynamically adjust (tune) the setting(s) for each bucket independent of the setting(s) for any other bucket. For example, the prefetch distance (e.g., the current prefetch distance, the initial prefetch distance, and/or the maximum prefetch distance) associated with bucket 1 can be changed independent of the prefetch distance associated with bucket 2. Similarly, the confidence level for bucket 1 can be managed independent of the confidence level for bucket 2. Thus, relative to the settings of bucket 2, the prefetch distance for bucket 1 can have a different initial value, can change (increase or decrease) over time at a different rate and at different points in time, and can be capped at a different maximum value, for example.

In one embodiment, prefetching is permitted to cross from one physical memory page to another. That is, if a stream of access requests contains virtual addresses that map to more than one physical memory page then, prefetching can continue from a first physical memory page to a second physical memory page. In such an embodiment, page crossing prefetches may be issued for one bucket but not another.

In embodiments in which there is a hierarchy of caches, the prefetcher 220 can then direct prefetched cache lines to a selected cache on a per-bucket basis. More specifically, the prefetcher 220 can specify a destination for the cache lines that are prefetched based on the access requests included in each bucket. For example, prefetched cache lines associated with the first set of access requests A1 (bucket 1) can be prefetched to the first cache 211, and prefetched cache lines associated with the second set of access requests A2 (bucket 2) can be prefetched to the second cache 212. Prefetched cache lines associated with the different buckets do not necessarily have to be directed to different caches. In general, the cache lines associated with different buckets can be prefetched into the same cache or different caches. Also, a set of access requests can be prefetched into one cache at first, then prefetched into another cache at a later point if, for example, the confidence level for that set of access requests increases to a certain level.

Therefore, in one embodiment, the prefetcher 220 can observe the stream 402 of access requests, use the attributes of the access requests to identify a first set of related access requests A1, identify a pattern for the first set, prefetch a first set of cache lines based on that pattern, and direct the prefetched first set of cache lines into, for example, the first (e.g., L1) cache 211. In a similar manner, the prefetcher 220 can use attributes of the access requests to identify a second set of related access requests A2, identify a pattern for the second set, prefetch a second set of cache lines based on the second pattern, and direct the second set of prefetched cache lines into, for example, the second (e.g., L2) cache 212.

Thus, an attribute of an access request is used to identify a bucket for the access request, and the bucket in which the access request is placed is associated with different settings including a prefetch pattern, distance, and destination. In effect, a value of an attribute associated with a set of access requests can be used to select the destination for a cache line that is prefetched based on a pattern of that set of access requests; thus, in one embodiment, the destination cache is selected according to the value of the attribute.

Figure 5:
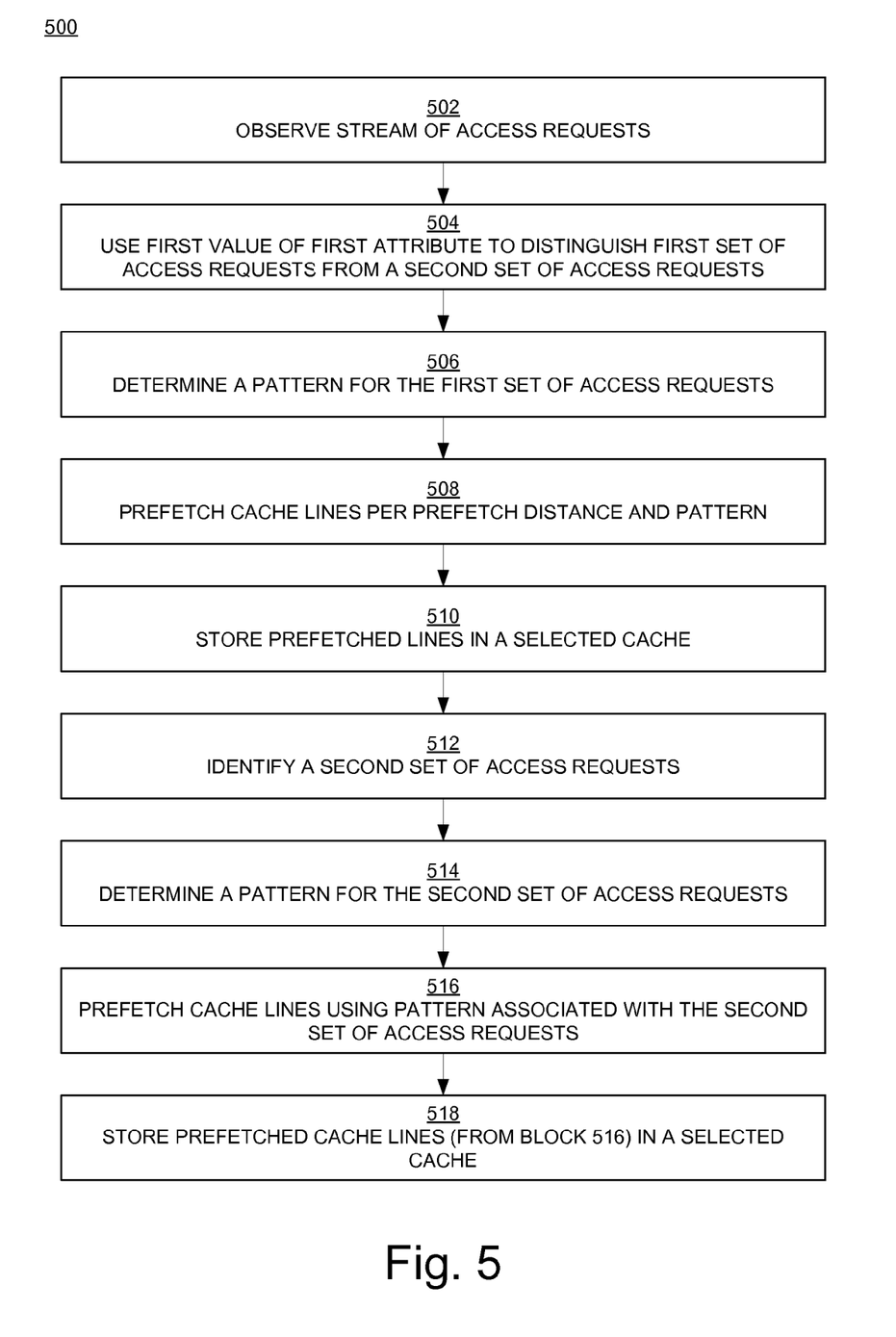
FIG. 5 is a flowchart of an example of a computer-implemented method for prefetching information in an embodiment according to the present invention.

FIG. 5 is a flowchart 500 of an example of a computer-implemented method for prefetching information (e.g., cache lines) in an embodiment according to the present invention. The flowchart 500 can be implemented as computer-executable instructions residing on some form of computer-readable storage medium (e.g., using computer system 100 of FIGS. 1 and 2).

In block 502, a stream of access requests is observed.

In block 504, a first value of a first attribute associated with the access requests is used to distinguish a first set of the access requests from a second set of the access requests.

In block 506, a pattern for the first set of access requests is determined.

In block 508, cache lines to be prefetched according to a prediction determined from the pattern are selected. The number of cache lines to be prefetched depends on, for example, the prefetch distance.

In block 510, the selected cache lines are prefetched into a cache in a hierarchy of caches. Thus, the prefetched cache lines associated with the first set of access requests, where the first set was identified according to the first value of the first attribute, are prefetched to a particular cache. Thus, in one embodiment, the destination for the prefetched cache lines is specified according to the first value of the first attribute.

In block 512, a second set of access requests can be identified using a second value of the first attribute. Alternatively, a second set of access requests can be identified using a value of a second attribute associated with the access requests.

In block 514, a pattern for the second set of access requests is determined.

In block 516, cache lines to be prefetched according to a prediction determined from the second pattern (block 514) are selected.

In block 518, the selected cache lines (from block 516) are prefetched into a cache in the hierarchy of caches. The cache in block 518 may be different from the cache of block 510.

Figure 6:
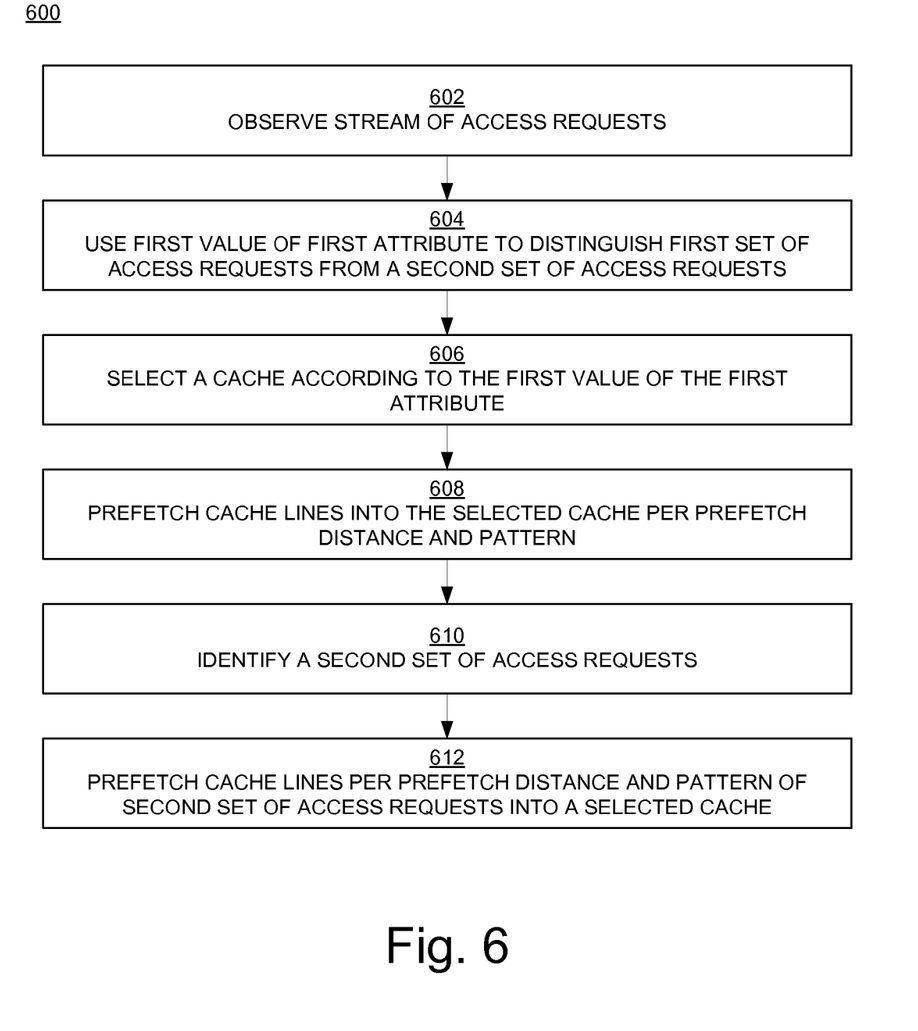
FIG. 6 is a flowchart of an example of a computer-implemented method for prefetching information in another embodiment according to the present invention.

FIG. 6 is a flowchart 600 of an example of a computer-implemented method for prefetching information (e.g., cache lines) in an embodiment according to the present invention. The flowchart 600 can be implemented as computer-executable instructions residing on some form of computer-readable storage medium (e.g., using computer system 100 of FIGS. 1 and 6).

In block 602, a stream of access requests is observed.

In block 604, a first value of a first attribute associated with the access requests is used to distinguish a first set of access requests from a second set of access requests.

In block 606, a cache in a hierarchy of caches is selected according to the first value of the first attribute.

In block 608, selected cache lines are prefetched into the selected cache. The cache lines are selected using a pattern of the first set of access requests. The number of cache lines to be prefetched depends on, for example, the prefetch distance.

In block 610, a second set of access requests is identified using a second value of the first attribute. Alternatively, the second set of access requests is identified using a value of a second attribute associated with the access requests.

In block 612, cache lines are selected using a pattern of the second set of access requests, and the selected cache lines are prefetched into a cache in the hierarchy of caches. The cache in block 612 may be different from the cache of blocks 606 and 608.

In summary, embodiments according to the present invention provide the capability to dynamically tune a prefetcher, allowing greater control over prefetcher settings such as prefetch destination (e.g., L1 cache versus L2 cache) and prefetch distance (including the initial, current, and maximum prefetch distance).

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of a fully functional computing system, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Various functions described herein may be provided through a remote desktop environment or any other cloud-based computing environment.

Embodiments according to the invention are thus described. While the present disclosure has been described in particular embodiments, it should be appreciated that the invention should not be construed as limited by such embodiments, but rather construed according to the below claims.

What is claimed is:

1. A system comprising:
   a plurality of caches; and
   a prefetcher coupled to the plurality of caches and configured to observe a stream of access requests comprising a first plurality of access requests, wherein each access request of the first plurality of access requests includes a respective physical address that is within a first physical memory page, the first plurality of access requests interleaved in the stream with a second plurality of access requests, wherein each access request of the second plurality of access requests includes a respective physical address that is within a second physical memory page, the prefetcher further configured to filter the first plurality of access requests in the stream from the second plurality of access requests in the stream using the respective physical addresses within the first physical memory page and the respective physical addresses within the second physical memory page to distinguish the first plurality of access requests from the second plurality of access requests, the prefetcher further configured to examine the first plurality of access requests and to determine a pattern of the first plurality of access requests using the respective physical addresses within the first physical memory page, the prefetcher operable for determining a first prefetch distance comprising a first number of cache lines to be prefetched according to the pattern of the first plurality of access requests; the prefetcher further operable for filtering the second plurality of access requests in the stream from the first plurality of access requests in the stream using the respective physical addresses within the first physical memory page and the respective physical addresses within the second physical memory page to distinguish the second plurality of access requests from the first plurality of access requests, the prefetcher further configured to examine the second plurality of access requests and to determine a pattern of the second plurality of access requests using the respective physical addresses within the second physical memory page, the prefetcher further operable for determining a second prefetch distance comprising a second number of cache lines to be prefetched according to the pattern of the second plurality of access requests, the second number different from the first number, the prefetcher further operable for changing the first prefetch distance and the second prefetch distance independently of one another at different respective rates and at different respective times.

2. The system of claim 1 wherein the prefetcher is further operable for prefetching the first number of cache lines into a cache of the plurality of caches, wherein the cache that receives the first number of cache lines is selected based on the respective physical addresses within the first physical memory page.

3. The system of claim 2 wherein the prefetcher is further operable for prefetching the second number of cache lines into a cache of the plurality of caches, wherein the cache that receives the second number of cache lines is selected based on the respective physical addresses within the second physical memory pace.

4. The system of claim 1 wherein the prefetcher is further configured to adjust a confidence level for the first plurality of access requests independent of adjusting a confidence level for the second plurality of access requests.

5. The system of claim 1 wherein the prefetcher is further configured to prefetch cache lines for the first plurality of access requests to a first cache and prefetch cache lines for the second plurality of access requests to a second cache that is different from the first cache.

6. A computer system comprising:
a processing unit; and
memory coupled to the processing unit and having stored therein instructions that, if executed by the computer system, cause the computer system to execute a prefetcher that performs operations comprising:
observing a stream of access requests comprising a first plurality of access requests in the stream that are associated with a first application, wherein each access request of the first plurality of access requests includes a respective physical address that is within a first physical memory page, wherein the first plurality of access requests are interleaved in the stream with a second plurality of access requests in the stream that are associated with a second application, wherein each access request of the second plurality of access requests includes a respective physical address that is within a second physical memory page;

using the respective physical addresses within the first physical memory page and the respective physical addresses within the second physical memory page to distinguish the first plurality of access requests in the stream from the second plurality of access requests in the stream;
using the respective physical addresses within the first physical memory page and the respective physical addresses within the second physical memory page to distinguish the second plurality of access requests in the stream from the first plurality of access requests in the stream;
determining a pattern of the first plurality of access requests using the respective physical addresses within the first physical memory page;
determining a pattern of the second plurality of access requests using the respective physical addresses within the second physical memory page;
selecting a first prefetch distance comprising a first number of cache lines to be prefetched according to the pattern of the first plurality of access requests; and
selecting a second prefetch distance comprising a second number of cache lines to be prefetched according to the pattern of the second plurality of access requests.

7. The computer system of claim 6 wherein the operations performed by the prefetcher further comprise prefetching the first number of cache lines into a cache of the plurality of caches, wherein the cache that receives the first number of cache lines is selected based on the respective physical addresses within the first physical memory page.

8. The computer system of claim 7 wherein the operations performed by the prefetcher further comprise prefetching the second number of cache lines into a cache of the plurality of caches, wherein the cache that receives the second number of cache lines is selected based on the respective physical addresses within the second physical memory page.

9. A method implemented by a computer system comprising a processor, a memory, and a plurality of caches coupled to the processor and the memory, the method comprising:
observing a stream of access requests comprising a first plurality of access requests in the stream that are associated with a first application, wherein the first plurality of access requests are interleaved in the stream with a second plurality of access requests in the stream that are associated with a second application, wherein each access request of the first plurality of access requests includes a respective physical address that is within a first physical memory page and each access request of the second plurality of access requests includes a respective physical address that is within a second physical memory page;
using the respective physical addresses within the first physical memory page and the respective physical addresses within the second physical memory page to distinguish the first plurality of access requests in the stream from the second plurality of access requests in the stream;
determining a first pattern of the first plurality of access requests using the respective physical addresses within the first physical memory pace;
determining a second pattern of the second plurality of access requests using the respective physical addresses within the second physical memory page;

selecting a cache of the plurality of caches according to the respective physical addresses within the first physical memory page;

selecting a cache of the plurality of caches according to the respective physical addresses within the second physical memory;

selecting a first prefetch distance comprising a first number of cache lines according to the first pattern;

selecting a second prefetch distance comprising a second number of cache lines according to the second pattern, the second number different from the first number;

prefetching the first number of cache lines into the cache selected according to the respective physical addresses within the first physical memory page, and prefetching the second number of cache lines into the cache selected according to the respective physical addresses within the first physical memory page; and changing the first prefetch distance and the second prefetch distance independently of one another at different respective rates and at different respective times.

* * * * *